Oct. 8, 1929.  A. T. CLARK ET AL  1,730,917
CAR TRUCK
Filed July 8, 1925  2 Sheets-Sheet 1
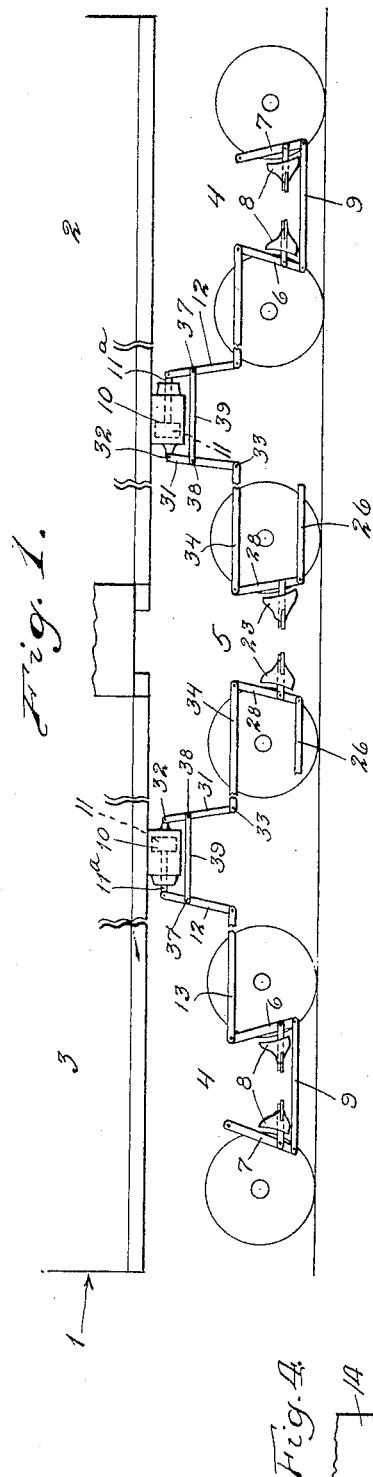
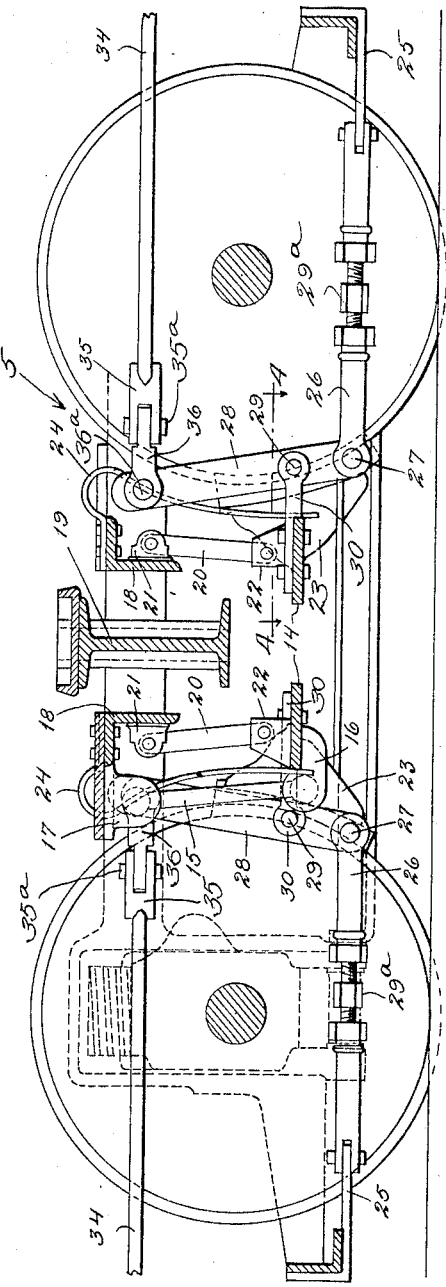
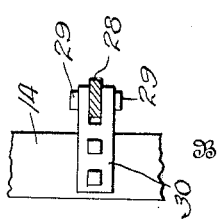
Inventors
Alfred T. Clark
Henry A. Levahauser
John R. Jester
By
his Attorney

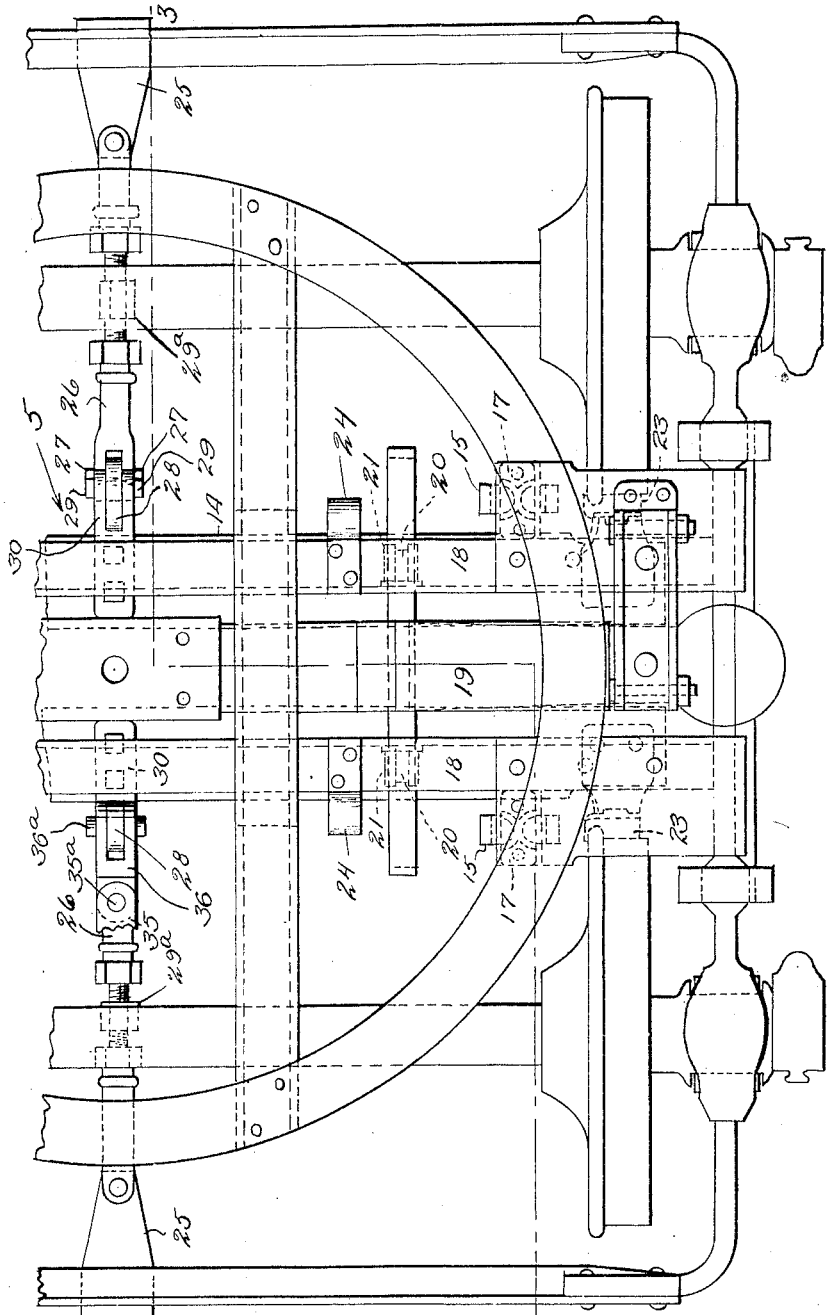

Patented Oct. 8, 1929

1,730,917

UNITED STATES PATENT OFFICE

ALFRED T. CLARK, HENRY A. LEONHAUSER, AND JOHN R. JESTER, OF BALTIMORE, MARYLAND

CAR TRUCK

Application filed July 8, 1925. Serial No. 42,166.

The invention relates to articulated cars.

The principal object of the invention, generally stated, is to provide an improved brake mechanism for the center truck of articulated cars.

The object of the invention, more particularly stated, is to provide a brake mechanism in which the brake beams and shoes acting in connection with the wheels of the center truck are operated simultaneously with and respectively by means of the actuating mechanism for the brakes of the end trucks.

Another object of the invention is the provision of a brake mechanism for the center truck of articulated cars in which the brakes for the respective pairs of wheels thereof are operated in unison with the brakes of the adjacent end trucks.

In cars of this type it is well known that each end truck has separate brake mechanism thereon, whereas the center truck may not be provided with brakes or may have a brake mechanism operatively connected with the actuating mechanism for the brakes of either end truck, a condition which is disadvantageous in that in case of failure of the braking mechanism of that end truck controlling or operating the brake mechanism for the center truck there is then a deficiency in the braking action, hence it is an object of the present invention not only to increase the braking action by providing brakes for the wheels of the center trucks but to insure the application of brakes to the center truck even though the braking mechanism for one of the end trucks should, for any reason, fail.

Still another object is the provision of a brake mechanism for the center truck of an articulated car embodying a novel arrangement of brake beams, levers, hangers and other accessories to insure proper action such as the quick application of the brakes and quick release, other features being means connected with the air pistons of the end truck brake mechanisms for moving the brake beams of the center truck.

To the attainment of the foregoing and other objects and advantages the invention preferably consists in the construction and the combination and arrangement of parts to be hereinafter more fully described and claimed, and illustrated in the accompanying drawings in which:

Figure 1 is a diagrammatic side elevation of an articulated car showing the brake mechanism of the present invention installed, Figure 2 is a partial plan view of the center truck with the brake mechanism thereon, various non-essential details being omitted, Figure 3 is a longitudinal section through the center truck taken along substantially the line 3—3 of Figure 2, with parts unnecessary to the disclosure omitted.

Figure 4 is a fragmentary detail sectional view taken on the line 4—4 of Figure 3.

Referring to the drawings in detail the numeral 1 represents, generally, an articulated car including sections 2 and 3 pivotally connected in the customary manner and carried by end trucks 4 and a center truck 5, the latter of which is located beneath the point of connection of the car sections. Each end truck 4 is equipped with a brake mechanism including live and dead levers 6 and 7 suitably connected with brake beams carrying brake shoes 8. The levers 6 and 7 are connected as by a link 9 for simultaneous movement. The operating means ordinarily consists of a cylinder 10 having operating therein a piston 11 carried by a piston rod 11ᵃ which is pivotally connected with a lever 12 in turn pivotally connected with a link 13 connected with the live lever 6. The lever 12 is necessarily pivoted so that when air is introduced within either cylinder 10 and the piston 11 forced out the lever 12 will rock and exert a pull upon the link 13 for rocking the levers 6 and 7 in opposite directions and bringing the brake shoes 8 into engagement with the wheels.

In carrying out the invention we provide in connection with the center truck, brake beams 14 suspended by hangers 15 which have their lower ends connected with castings 16 on the brake beams and their upper ends connected with brackets 17 supported from angle bars 18 which extend transversely of the center truck at opposite sides of the bolster 19 thereof. We also preferably provide safety or auxiliary hangers 20 pivoted upon brackets 21 carried by the angle bars 18 and also pivoted within brackets 22 on the brake beams 14. These safety hangers are preferably located inwardly of the main hangers 15 so that the brake beams will be supported at a plurality of spaced points so as to insure proper strength and prevent bending or yielding under strain.

The brake beams 14 carry the brake shoes indicated at 23 and these shoes are of course arranged with respect to the wheels in the usual manner. Suitably secured to the truck frame as for instance to the angle bars 18 are leaf springs 24 which engage against the brake beams 14 for the purpose of urging them and consequently the shoes carried thereby into released or inoperative position.

Secured to the end portions of the center truck are plate or bracket members 25 with which are connected longitudinally adjustable fulcrum members 26 upon the inner ends of which are pivoted, at 27, operating levers 28 with which are pivotally connected at 29 links 30 suitably secured to the brake beams 14 so that when the levers are moved the brake beams and brake shoes will be correspondingly moved. The fulcrum members 26 are adjustable for the purpose of regulating or varying the pivot points of the operating levers 28 and, for this reason, preferably embody a turnbuckle arrangement or structure indicated at 29$^a$.

The means for operating the levers 28 preferably consists of levers 31 pivoted at 32 at suitable points, for instance on the cylinders 10 and pivotally connected at 33 with links or rods 34 which carry clevises 35 with which are pivotally connected at 35$^a$ forks 36 pivoted at 36$^a$ to the levers 28. Connecting the intermediate portions of the levers 12 and 31 at the points 37 and 38 are bridle bars 39 which operate to transmit the movement of the pistons to the levers 31.

In the operation it will be apparent that when air is introduced within the cylinders 10 the levers 12 will rock upon the pivot points 37 so that a pull will be exerted upon the links 13. The movement of the links results in movement of the levers 6 and 7 and the application of the brake shoes 8 to the wheels of the end trucks. When the levers 12 rock upon their pivots 37 it is also clear that longitudinal movement will be imparted to the bridle bar 39 so that the levers 31 will be swung upon their pivots 32, longitudinal movement being of course imparted to the links or rods 34 connected with the levers 28. Obviously, the levers 28 will be rocked upon their fulcrum points 27 and owing to the connections 30 it will be seen that the brake beams 14 will be moved away from each other, bringing the brake shoes into contact with the respective pairs of wheels of the center truck.

A brake mechanism constructed and installed in accordance with this invention will be highly effective owing to the increase in the braking surface resulting from the application of brakes to the wheels of the center truck. In view of the fact that two of the wheels of the center truck are braked by the mechanism provided for the front truck and that the remaining two are braked by the mechanism provided for the rear truck, it is obvious that there will be uniformity in the distribution of the braking action and that in case of failure of the braking mechanism of either end truck the mechanism for the other will still operate to effect actuation of a portion of the braking mechanism of the center truck.

While we have shown and described a preferred embodiment of the invention, it should be understood that the disclosure is merely illustrative as the right is reserved to make all such changes and modifications as will widen the scope of the invention and increase its adaptability, provided such variations constitute no departure from the spirit of the invention or the scope of the claims hereunto appended.

Having thus described the invention, we claim:

1. In an articulated car having a center truck and end trucks, brake mechanism for the wheels of the end trucks, and brake mechanism for the wheels of the center truck operatively connected with the brake mechanism of the end trucks for simultaneous actuation therewith.

2. In an articulated car having a center truck and end trucks and provided with brake mechanism for the wheels of the end trucks, brake mechanism for the wheels of the center trucks, and means connecting the last-named mechanism with the brake mechanism of the respective end trucks.

3. In an articulated car having end trucks and a center truck, brake mechanism on each end truck, a brake mechanism for each pair of wheels of the center truck, and means connecting each last-named brake mechanism with the brake mechanism of the adjacent end truck.

4. In an articulated car having end trucks and a center truck, and brake mechanism for the end trucks, the combination of brake mechanism for the respective pairs of wheels of the center truck operatively connected with the brake mechanism of the respective end trucks.

5. In an articulated car having end trucks and a center truck, brake mechanism for the end trucks, a brake mechanism for the wheels of the center trucks including brake beams carrying brake shoes and further including pivoted upstanding operating levers, and operative connections between said levers and the brake mechanisms of the respective end trucks.

6. In an articulated car having end trucks and a center truck, a brake mechanism for each end truck, a brake mechanism for the respective pairs of wheels of the center truck, and means for simultaneously operating the last-named brake mechanism with the brake mechanism of the end trucks.

7. A center truck for articulated cars, the truck including transverse supporting bars, brake beams carrying brake shoes engageable with the respective pairs of wheels, hangers pivotally suspended from said transverse supports and pivotally connected with the brake beams, auxiliary hangers pivotally connected with said supports and with the brake beams, fulcrum members at the lower portion of the truck, operating levers pivoted on said fulcrum members and having pivotal connections with the adjacent respective brake beams, and means for applying a pull upon a selected operating lever.

8. In an articulated car having end trucks provided with brake mechanisms, a center truck embodying pairs of wheels, transverse supporting bars at the top of the center truck, a brake beam for each pair of wheels carrying brake shoes adapted to cooperate therewith, a pair of hangers pivotally connected with each transverse bar and pivotally supporting each brake beam, a pair of auxiliary hangers pivotally suspended from the transverse bars inwardly of the first named hangers and pivotally connected with each brake beam, separate fulcrum members at the lower portion of the center truck extending inwardly from the ends thereof, an operating lever pivoted at its lower end upon each fulcrum member and having pivotal connection with the adjacent brake beam, and means connected with each lever and adapted to be operated simultaneously with the operation of the brake mechanism of an end truck.

In testimony whereof we affix our signatures.

ALFRED T. CLARK.
HENRY A. LEONHAUSER.
JOHN R. JESTER.